(12) United States Patent
Matlija

(10) Patent No.: US 9,860,222 B2
(45) Date of Patent: Jan. 2, 2018

(54) DEVICE, METHOD, AND SYSTEM FOR STAGING ACCOUNT SETUP

(71) Applicant: RESEARCH IN MOTION LIMITED, Waterloo (CA)

(72) Inventor: Alvis Matlija, Kitchener (CA)

(73) Assignee: BLACKBERRY LIMITED, Waterloo (CA)

( * ) Notice: Subject to any disclaimer, the term of this patent is extended or adjusted under 35 U.S.C. 154(b) by 513 days.

(21) Appl. No.: 13/629,783

(22) Filed: Sep. 28, 2012

(65) Prior Publication Data

US 2014/0095595 A1    Apr. 3, 2014

(51) Int. Cl.
*H04L 29/06* (2006.01)

(52) U.S. Cl.
CPC ............ *H04L 63/08* (2013.01); *H04L 63/083* (2013.01)

(58) Field of Classification Search
CPC ......... H04M 1/72563; H04M 1/72552; H04L 51/38; H04L 51/28; H04L 67/34; H04L 67/04; H04L 67/06; H04L 67/20; H04L 63/08; H04L 63/083
USPC ............. 709/204, 220; 455/418, 566, 435.1; 726/5
See application file for complete search history.

(56) References Cited

U.S. PATENT DOCUMENTS

| | | | | |
|---|---|---|---|---|
| 8,949,956 B1 * | 2/2015 | Baldwin | ............... | G06Q 10/107 709/206 |
| 2003/0088452 A1 | 5/2003 | Kelly | | |
| 2003/0130950 A1 * | 7/2003 | Ahles | ..................... | G06Q 20/04 705/45 |
| 2006/0129835 A1 * | 6/2006 | Ellmore | ............... | G06Q 20/108 713/183 |
| 2007/0178899 A1 * | 8/2007 | Kuhn | ..................... | H04W 8/04 455/435.1 |
| 2008/0096507 A1 | 4/2008 | Erola | | |
| 2009/0093242 A1 * | 4/2009 | Bhalekar | ........... | H04M 1/72552 455/418 |
| 2010/0082777 A1 | 4/2010 | Montgomery et al. | | |
| 2011/0034158 A1 * | 2/2011 | Bradley | ................. | G06Q 10/10 455/418 |
| 2011/0112919 A1 * | 5/2011 | Gray | ..................... | G06Q 20/12 705/17 |
| 2012/0078735 A1 * | 3/2012 | Bauer | .................... | G06Q 20/20 705/16 |
| 2012/0079513 A1 * | 3/2012 | Nahata | ............... | H04N 21/2225 725/5 |

(Continued)

OTHER PUBLICATIONS

Mark, Yahoo Mail, https://i.ytimg.com/vi/9Zt0sc95bZl/maxresdefault.jpg.*

(Continued)

*Primary Examiner* — Thomas Dailey
*Assistant Examiner* — Aye M Aung
(74) *Attorney, Agent, or Firm* — Perry + Currier Inc.

(57) ABSTRACT

A device, method and system for staging account setup are provided. An account identifier indicative of an account is transmitted from a device to a server. An indication that the account is of a given type is received at the device from the server. At a display of the device, staged prompts for information associated with the account are provided, the staged prompts depending on the indication, each staged prompt provided at successive screens of the display, wherein different staged prompts for different account types are provided in a same application.

17 Claims, 10 Drawing Sheets

(56) References Cited

U.S. PATENT DOCUMENTS

2013/0198823 A1* 8/2013 Hitchcock ............... G06F 21/41
 726/6
2014/0237563 A1* 8/2014 Zhang .................. H04L 63/083
 726/5

OTHER PUBLICATIONS

Sieber, Tina, How to import & manage multiple email accounts in gmail, Feb. 29, 2012, http://www.makeuseof.com/tag/import-manage-multiple-email-accounts-gmail/.*
Ben Bucksch: "Autoconfiguration in Thunderbird"—Feb. 24, 2012, pp. 1-4, XP002691390. Retrieved from the Internet: URL:https://developer.mozilla.org/en-US/docs/Thunderbird/Autoconfiguration [retrieved on Jan. 31, 2013].
Corresponding European Patent Application No. 12186589.3 Search Report dated Feb. 12, 2013.

* cited by examiner

DEVICE, METHOD, AND SYSTEM FOR STAGING ACCOUNT SETUP

FIELD

The specification relates generally to mobile devices, and specifically to a device, method, and system for staging account setup.

BACKGROUND

The evolution of computers is currently quite active in the mobile device environment. It is now well-known to include calendaring, contacts, and messaging functions in mobile devices. More recently, there has been a veritable explosion of the number and type of applications that are configured to the unique form factors and computing environments of mobile devices.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
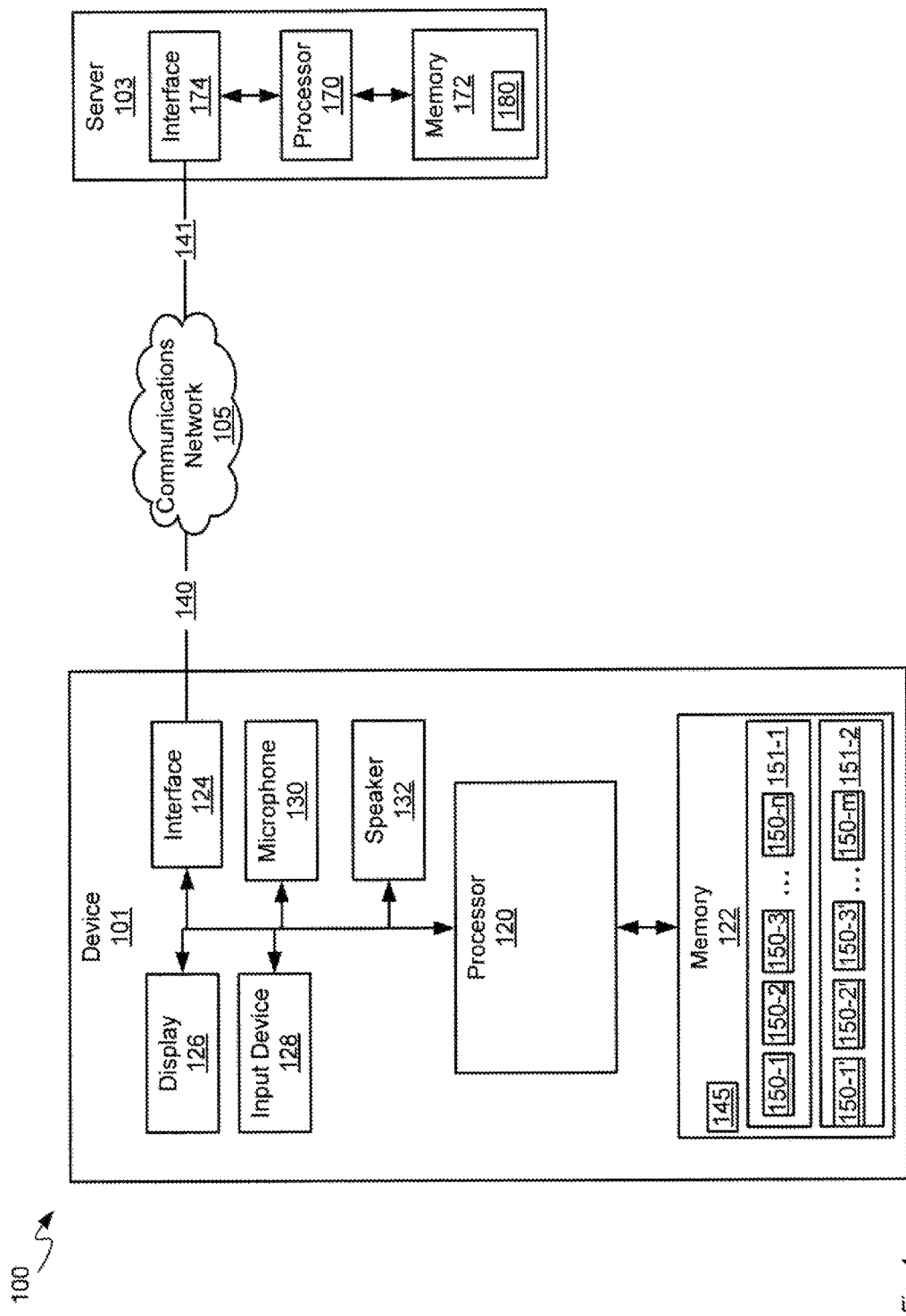
FIG. 1 depicts a system including a device for staging account setup, according to non-limiting implementations.

An aspect of the specification provides a device comprising: a processor and a display, the processor enabled to: transmit, to a server, an account identifier indicative of an account; receive, from the server, an indication that the account is of a given type; and, provide, at the display, staged prompts for information associated with the account, the staged prompts depending on the indication, each staged prompt provided at successive screens of the display, wherein different staged prompts for different account types are provided in a same application.

The processor can be further enabled to receive the account identifier in one or more of the same application and a list of messages.

When the account is of first type, a first series of staged prompts can be provided in the same application and when the account is of a second type, a second series of staged prompts can be provided in the same application.

The given type can be one of a corporate account and a personal account.

The information can comprise one or more of an activation code, an account password and a device password.

Each of the staged prompts can be provided with data identifying respective information to be received at a respective staged prompt.

The processor can be further enabled to: receive respective information in response to providing a respective staged prompt; and, provide a next staged prompt to receive next information.

The processor can be further enabled to, when a given staged prompt is a last staged prompt, and last information is received: receive, in the same application, another account identifier indicative of another account; transmit, to the server, the another account identifier; receive, from the server, another indication that the different account is of a respective type; and, provide, in the same application, more staged prompts at the display for respective information associated with the different account, the more staged prompts depending on the another indication.

The processor can be further enabled to, when a given staged prompt is a last staged prompt, and last information is received, close the same application.

Data for generating the staged prompts can be stored at a memory of the device.

Another aspect of the specification provides a method comprising: transmitting, from a device to a server, an account identifier indicative of an account; receiving, at the device from the server, an indication that the account is of a given type; and, providing, at a display of the device, staged prompts for information associated with the account, the staged prompts depending on the indication, each staged prompt provided at successive screens of the display, wherein different staged prompts for different account types are provided in a same application.

The method can further comprise receiving the account identifier in one or more of the same application and a list of messages.

When the account is of first type, a first series of staged prompts can be provided in the same application and when the account is of a second type, a second series of staged prompts can be provided in the same application.

The given type can be one of a corporate account and a personal account.

The information can comprise one or more of an activation code, an account password and a device password.

Each of the staged prompts can be provided with data identifying respective information to be received at a respective staged prompt.

The method can further comprise: receiving respective information in response to providing a respective staged prompt; and, providing a next staged prompt to receive next information.

The method can further comprise, when a given staged prompt is a last staged prompt, and last information is received: receiving, in the same application, another account identifier indicative of another account; transmitting, to the server, the another account identifier; receiving, from the server, another indication that the different account is of a respective type; and, providing, in the same application, more staged prompts at the display for respective information associated with the different account, the more staged prompts depending on the another indication.

The method can further comprise, when a given staged prompt is a last staged prompt, and last information is received, close the same application.

A further aspect of the specification provides a computer program product, comprising a computer usable medium having a computer readable program code adapted to be executed to implement a method comprising: transmitting, from a device to a server, an account identifier indicative of an account; receiving, at the device from the server, an indication that the account is of a given type; and, providing, at a display of the device, staged prompts for information associated with the account, the staged prompts depending on the indication, each staged prompt provided at successive screens of the display, wherein different staged prompts for different account types are provided in a same application. The computer usable medium can comprise a non-transitory computer usable medium.

FIG. 1 depicts a system 100 comprising for staging account setup, according to non-limiting implementations. System 100 generally comprises device 101 in communication with a server 103 via at least one communications network 105, according to non-limiting implementations. The at least one communications network 105 will be interchangeably referred to hereafter as network 105. Device 101 comprises a processor 120 interconnected with a memory 122, a communications interface 124 (interchangeably referred to hereafter as interface 124), a display 126 and an input device 128, and optionally a microphone 130 and speaker 132. It is further appreciated that device 101 communicates with a server 103 via interface 124, a link 140 between device 101 and network 105, and a link 141 between server 103 and network 105.

Device 101 further stores an application 145 staging account setup and data 150-1, 150-2, 150-3 . . . 150-n, 150-1', 150-2', 150-3' . . . 150-m for generating staged prompts at memory 122. Data 150-1, 150-2, 150-3 . . . 150-n, 150-1', 150-2', 150-3' . . . 150-m will also be referred to hereafter generically as data 150 and collectively as data 150. It is further appreciated that data 150 can be divided into at least two subsets 151-1, 151-2 of data 150. In non-limiting depicted implementations, subset 151-1 comprises data 150-1, 150-2, 150-3 . . . 150-n, while subset 151-2 comprises data 150-1', 150-2', 150-3' . . . 150-m. Subsets 151-1, 151-2 will also be referred to hereafter generically as subsets 151 and collectively as subset 151.

In general, items of data 150 can be used to generate a different staged prompts. Further, different account types are associated with a different subset 151 of data 150 and hence a different subset of staged prompts, as will presently be described. Hence, device 101 can store any suitable number of items of data 150, for generating staged prompts for different account types. Furthermore, data 150 is used by processor 120 to generate staged prompts for setting up accounts when processor 120 is processing application 145.

In any event, as will presently be described, processor 120 is generally enabled to: transmit, to server 103, an account identifier indicative of an account; receive, from server 103, an indication that the account is of a given type; and, provide, at display 126, staged prompts for further information associated with the account, the staged prompts depending on the indication, each staged prompt provided at successive screens of display 126, wherein different staged prompts for different account types are provided in same application 145. In doing so, processor 120 associates a given account with device 101 such that data associated with the given account can be one or more of received at, transmitted to, and pushed to device 101. For example, processor 120 can associate a given email account with device 101 such that device 101 can automatically receive email associated with the account at device 101.

Device 101 can be any type of electronic device that can be used in a self-contained manner to process application 145. Device 101 includes, but is not limited to, any suitable combination of electronic devices, communications devices, computing devices, personal computers, laptop computers, portable electronic devices, mobile computing devices, portable computing devices, tablet computing devices, laptop computing devices, desktop phones, telephones, PDAs (personal digital assistants), cellphones, smartphones, e-readers, internet-enabled appliances and the like. Other suitable devices are within the scope of present implementations.

Server 103 is generally enabled to determine a type of account based on an indication of the account received from device 101. Server 103 generally comprises a processor 170 interconnected with a memory 172 and a communications interface 174 (referred to interchangeably hereafter as interface 174). In particular, memory 172 can store data 180 that identities accounts associated with server 103, and can further store data associated with accounts, including but not limited to password data, activation code data, and the like, as described below. In general, it will be appreciated that interface 174 is configured to correspond with the network architecture that is used to implement link 141, as described below.

Server 103 can otherwise be based on any well-known server environment including a module that houses one or more central processing units (i.e. processor 170 comprises one or more central processing units), volatile memory (e.g. random access memory), persistent memory (e.g. hard disk devices) (i.e. memory 172 comprises volatile memory and persistent memory) and network interfaces (i.e. interface 174 comprises one or more network interfaces) to allow server 103 to communicate over link 141. For example, server 103 can comprise a Sun Fire 8800 series server running a UNIX operating system, from Oracle Corporation, Inc. of Santa Clara Calif., and having eight central processing units each operating at about three thousand megahertz and having more than sixteen gigabytes of random access memory. However, it is to be emphasized that this particular server is merely exemplary, and a vast array of other types of computing environments for server 103 are contemplated. It is further more appreciated that server 103 can comprise any suitable number of servers that can perform different functionality of server implementations described herein.

Link 140 comprises any suitable link for enabling device 101 to communicate with network 105. Similarly, link 141 comprises any suitable link for enabling server 103 to communicate with network 105. Links 140, 141 can hence each include any suitable combination of wired and/or wireless links, wired and/or wireless devices and/or wired and/or wireless networks, including but not limited to any suitable combination of USB (universal serial bus) cables, serial cables, wireless links, cell-phone links, cellular network links (including but not limited to 2G, 2.5G, 3G, 4G+, and the like) wireless data, Bluetooth links, NFC (near field communication) links, WiFi links, WiMax links, packet based links, the Internet, analog networks, the PSTN (public switched telephone network), access points, and the like, and/or a combination.

It is appreciated that FIG. 1 further depicts a schematic diagram of device 101 according to non-limiting implementations. It should be emphasized that the structure of device 101 in FIG. 1 is purely an example, and contemplates a device that can be used for both wireless voice (e.g. telephony) and wireless data communications (e.g. email, web browsing, text, and the like). However, while FIG. 1 contemplates a device that can be used for telephony, in other implementations, device 101 can comprise a device enabled for implementing any suitable specialized functions, including but not limited to one or more of telephony, computing, appliance, and/or entertainment related functions.

Device 101 comprises at least one input device 128 generally enabled to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations.

Input from input device 128 is received at processor 120 (which can be implemented as a plurality of processors, including but not limited to one or more central processors (CPUs)). Processor 120 is configured to communicate with a memory 122 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 101 as described herein are typically maintained, persistently, in memory 122 and used by processor 120 which makes appropriate utilization of volatile storage during the execution of such programming instructions. Those skilled in the art recognize that memory 122 is an example of computer readable media that can store programming instructions executable on processor 120. Furthermore, memory 122 is also an example of a memory unit and/or memory module.

In particular, it is appreciated that memory 122 stores application 145, that, when processed by processor 120, enables processor 120 to: transmit, to server 103, an account identifier indicative of an account; receive, from server 103, an indication that the account is of a given type; and, provide, at display 126, staged prompts for further information associated with the account, the staged prompts depending on the indication, each staged prompt provided at successive screens of display 126, wherein different staged prompts for different account types are provided in same application 145.

Specifically, application 145 can be used for setting up accounts of different types, including but not limited to personal information manager (PIM) accounts, email accounts, calendar accounts, contact accounts and the like. Hence, application 145 can comprise an account setup application. Hence, application 145 can be used to associate one or more accounts with device 101 such that data associated with the one or more accounts can be received at, transmitted to, and/or pushed to device 101. Association of device 101 with a given account can comprise storing passwords, activation codes and the like at server 103 (and/or another server) in association with an identifier of device 101, for example in data 180.

It is yet further appreciated that application 145 is an example of programming instructions stored at memory 122.

Processor 120 in turn can also be configured to communicate with a display 126, and optionally a microphone 130 and a speaker 132. Display 126 comprises any suitable one of or combination of CRT (cathode ray tube) and/or flat panel displays (e.g. LCD (liquid crystal display), plasma, OLED (organic light emitting diode), capacitive or resistive touch screens, and the like). When display 126 comprises a touch screen, it is appreciated that display 126 and input device 128 can be combined into one apparatus. Microphone 130, when present, comprises any suitable microphone for receiving sound and converting the sound to sound data. Speaker 132, when present, comprises any suitable speaker for providing sound from sound data, audible alerts, audible communications received from remote communication devices, and the like, at device 101.

In some implementations, input device 128 and display 126 are external to device 101, with processor 120 in communication with each of input device 128 and display 126 via a suitable connection and/or link.

Processor 120 also connects to interface 124, which can be implemented as one or more radios and/or connectors and/or network adaptors, configured to communicate with network 105 via link 140. In general, it will be appreciated that interface 124 is configured to correspond with the network architecture that is used to implement link 140, as described above. In other implementations a plurality of links with different protocols can be employed and thus interface 124 can comprise a plurality of interfaces to support each link.

In any event, it is appreciated that any suitable combination of interfaces is within the scope of present implementations.

It is yet further appreciated that device 101 comprises a power source (not depicted), for example a battery or the like. In some implementations the power source can comprise a connection to a mains power supply and a power adaptor (e.g. and AC-to-DC (alternating current to direct current) adaptor).

Further, it should be understood that in general a wide variety of configurations for device 101 are contemplated.

Figure 2:
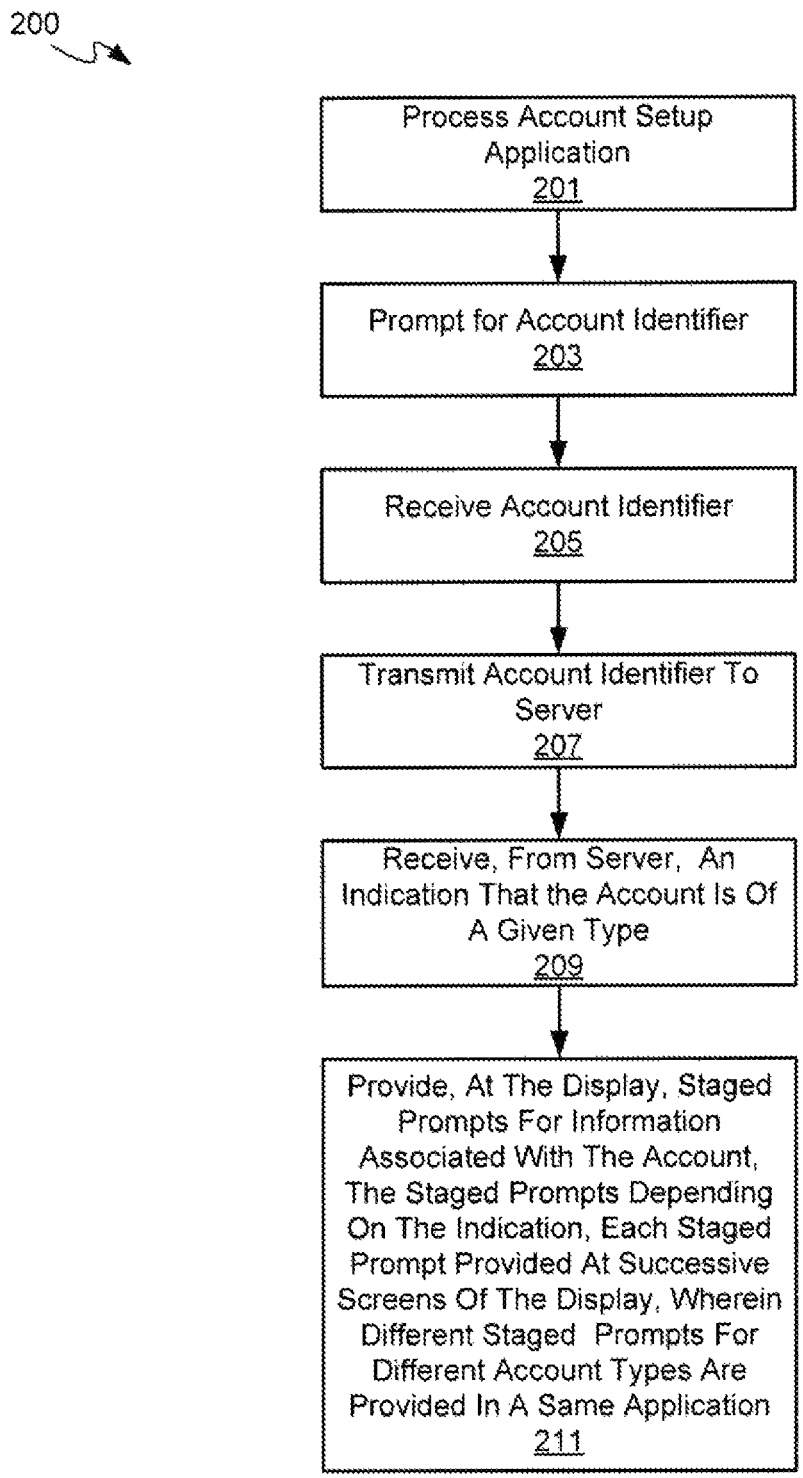
FIG. 2 depicts a flowchart of a method for staging account setup, according to non-limiting implementations.

Attention is now directed to FIG. 2 which depicts a flowchart of a method 200 for staging account setup, according to non-limiting implementations. In order to assist in the explanation of method 200, it will be assumed that method 200 is performed using system 100. Furthermore, the following discussion of method 200 will lead to a further understanding of system 100 and its various components. However, it is to be understood that system 100 and/or method 200 can be varied, and need not work exactly as discussed herein in conjunction with each other, and that such variations are within the scope of present implementations.

It is appreciated that, in some implementations, method 200 is implemented in system 100 by processor 120 of device 101. Indeed, method 200 is one way in which device 101 can be configured. It is to be emphasized, however, that method 200 need not be performed in the exact sequence as shown, unless otherwise indicated; and likewise various blocks may be performed in parallel rather than in sequence; hence the elements of method 200 are referred to herein as "blocks" rather than "steps". It is also to be understood, however, that method 200 can be implemented on variations of system 100 as well.

At block 201, processor 120 processes account setup application 145. It is appreciated that information received and provided in setting up accounts of different types is received via application 145, and using data 150 to generate staged prompts. At an optional block 203, processor 120 prompts for an account identifier, and at block 205, processor 120 receives the account identifier. The account identifier can be received via input device 128 (e.g. when processor

120 provides the prompt for the account identifier at block 203). For example, a user of device 101 can be in possession of an account identifier, including but not limited to an email address associated with an account: the account identifier can be received via a message, a browser or the like, and saved by the user in any suitable manner. The user can enter the account identifier using input device 128 at block 205 when prompted at block 203.

Alternatively, the account identifier can be received in a message received at device 101 via interface 124; in these implementations, processor 120 is enabled to process messages received via interface 124 to determine whether a given message comprises an account setup message, comprising the account identifier. When a message comprises an account setup message, processor 120 is enabled to extract the account identifier at block 205. Indeed, in these implementations, block 201 can be implemented after and/or in parallel with, block 205; further receipt of an account setup message can cause processor 120 to process account setup application 145 at block 201. An account setup message can be received from an account server and/or any other suitable remote computing device.

In particular, the account identifier can comprise an email address, having a format of: accountname@domainname.ext, where "accountname" comprises an account name, "domainname" comprises a domain name and ".ext" comprises an extension, including but not limited to ".com", ".net", and the like.

In any event, at block 207, processor 120 transmits the account identifier to server 103, for example via interface 124, network 105 and links 140, 141. Server 103 processes the account identifier to determine a type of account associated with the account identifier. For example, processor 170 can compare at least a portion of account identifier with data 180 to determine whether account identifier is associated with server 103. Further, it is appreciated that server 103 can be associated with a given domain name, and processor 170 can determine whether the account identifier comprises the given domain name. Further, data 180 can store names of accounts associated with server 103, and hence, processor 170 can compare the account identifier with data 180 to determine whether the account identifier comprises an account name stored in data 180.

When the account identifier is neither associated with server 103, nor stored in data 180, processor 170 can determine that an account identified by the account identifier is not associated with server 103, and hence is of a first account type. Alternatively, when at least a portion of the account identifier is one or more of associated with server 103 and stored in data 180, processor 170 can determine that an account identified by the account identifier is associated with server 103, and hence is of a second account type.

In some implementations, accounts not associated with server 103 can comprise personal accounts and accounts associated with server 103 can comprise corporate accounts. It is assumed, in these implementations, that server 103 is associated with an entity, and specifically a corporate entity, that has issued device 101 to a user. Alternatively, device 101 can be associated with a user, and server 103 can be enabled to manage accounts associated with device 101, whether or not the corporate entity has issued device 101. However, other types of accounts are within the scope of present implementations, for example corporate accounts of different types and/or personal accounts of different types. For example some corporate accounts can be associated with higher security conditions and/or higher security passwords and the like than other corporate accounts; and similarly, some personal accounts can be associated with higher security conditions and/or higher security passwords and the like than other personal accounts.

In any event, server 103 generates an indication that the account is of a given type and transmits the indication to device 101 via interface 174, network 105 and links 140, 141.

At block 209, processor 120 receives, from server 103, the indication that the account is of a given type. Indeed, the indication is received in response to transmitting the account identifier to the server at block 207. In some implementations, the given type can be one of a corporate account and a personal account.

At block 211, processor 120 provides, at display 126, staged prompts for information associated with the account, the staged prompts depending on the indication, each staged prompt provided at successive screens of display 126, as will presently be explained in further detail. Different staged prompts for different account types are provided in application 145, according to associated subset 151 of data 150.

Information received at block 211 can be transmitted to server 103, for example after each staged prompt is provided and respective information is received, such that server 103 can associate device 101 with the account, and thereafter allow data associated with the account to be one or more of received at, transmitted to and pushed to device 101. For example, one or more of an account activation code, an account password and a device password can be received at block 211 and stored in association with an identifier of device 101 at server 103. In other words, at block 211, processor 120: receives respective information in response to providing a respective staged prompt; transmits the respective information to server 103; and, provides a next staged prompt to receive next information.

Alternatively, information received at the staged prompts is stored at memory 122 and transmitted at the end of a series of staged prompts associated with the account type. Hence, in these implementations, processor 120: receives respective information in response to providing a respective staged prompt; and provides a next staged prompt to receive next information. Respective information is stored at memory 122 and transmitted when last respective information is received in response to a last staged prompt.

Further, staged prompts can be provided by processing subsets 151 of data 150. For example, when the account is of a first type, a first series of staged prompts are provided in application 145 by processing subset 151-1 of data 150 associated with the first type of account. When the account is of a second type, a second series of staged prompts are provided in application 145 by processing subset 151-2 of data 150 associated with the second type of account. In this manner, staged prompts for different account types are provided in the same application 145.

A non-limiting example of method 200 will now be described with reference to FIGS. 3, 4, 6, 7, 8 and 9, each depicting perspective views of display 126 of device 101, according to non-limiting implementations. It is further appreciated that each of FIGS. 3, 4, 6, 7, 8 and 9 shows graphic user interfaces (GUIs) of staged prompts associated with application 145. The non-limiting example of method 200 will be described with further reference to FIG. 5, which is similar to FIG. 1, with like elements having like numbers.

Figure 3:
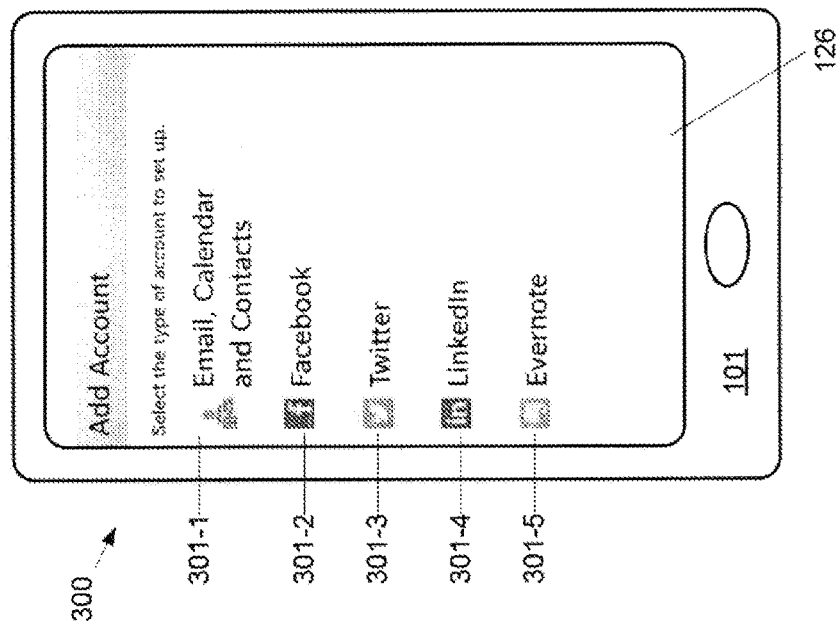
FIG. 3 depicts a Graphic User Interface (GUI) for initiating a staged account setup, according to non-limiting implementations.

FIG. 3 depicts device 101 when processor 120 processes a non-limiting implementation of application 145. In these implementations, application 145 is processed at block 201 and an application-type selection view 300 is provided, comprising options 301-1, 301-2, 301-3, 301-4, 301-5 for indicating a type of application for which an account is to be set up, including but not limited to, PIM applications, social networking applications, data storage applications, and the like. For example, option 301-1 is for indicating that an account is to be set up for a PIM application; options 301-2 to 301-3 is for indicating that an account is to be set up for respective social networking applications; and option 301-5 is for indicating that an account is be set up for a data storage application.

Figure 4:
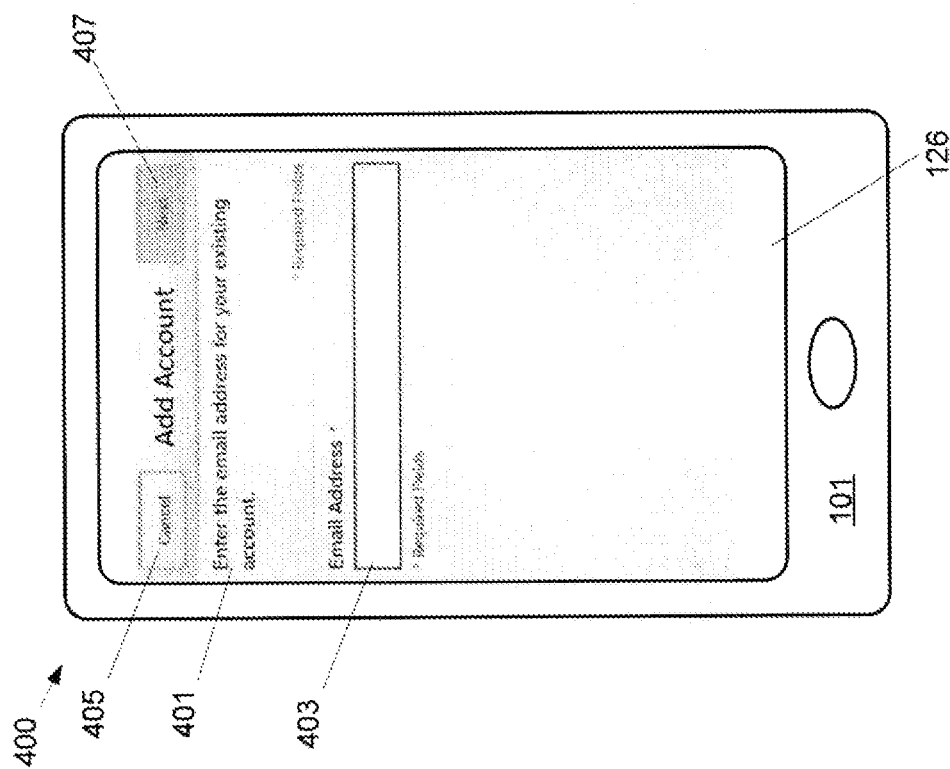
FIG. 4 depicts a Graphic User Interface (GUI) for receiving an account identifier, according to non-limiting implementations.

Presuming option 301-1 is selected (i.e. processor 120 receives, via input device 128, input indicative that option 301-1 is selected), with reference to FIG. 4, processor 120 provides an account-identifier-receive view 400 comprising a prompt 401 to add an account to device 101 and a field 403 for receiving an account identifier. In other words, an account associated with the application type selected at view 300 of FIG. 3 is to be associated with device 101 by receiving an account identifier at field 403, including, but not limited to, an email address. However, other account identifiers are within the scope of present implementations, including, but not limited to a name of an account.

In depicted non-limiting implementations, a selectable option 405 for exiting view 400 to either return to view 300 and/or exit application 145 is also provided. Further, in depicted non-limiting implementations, a selectable option 407 for causing processor 120 to generate a next staged prompt is also provided. For example, an account identifier data is received at field 403, and when input data indicating that selectable option 407 has been actuated is received, a staged prompt (e.g. see FIG. 6) is provided. In some implementations, option 407 is not selectable until an account identifier is received at field 403.

It is yet further appreciated that block 203 can comprise providing view 400, and at least providing prompt 401 and field 403. Further, block 205 can comprise receiving the account identifier at field 403.

However, it is further appreciated that, in some implementations, views 300 and 400 are optional, for example, in implementations where the account identifier is received in an account setup message, as described above.

Figure 5:
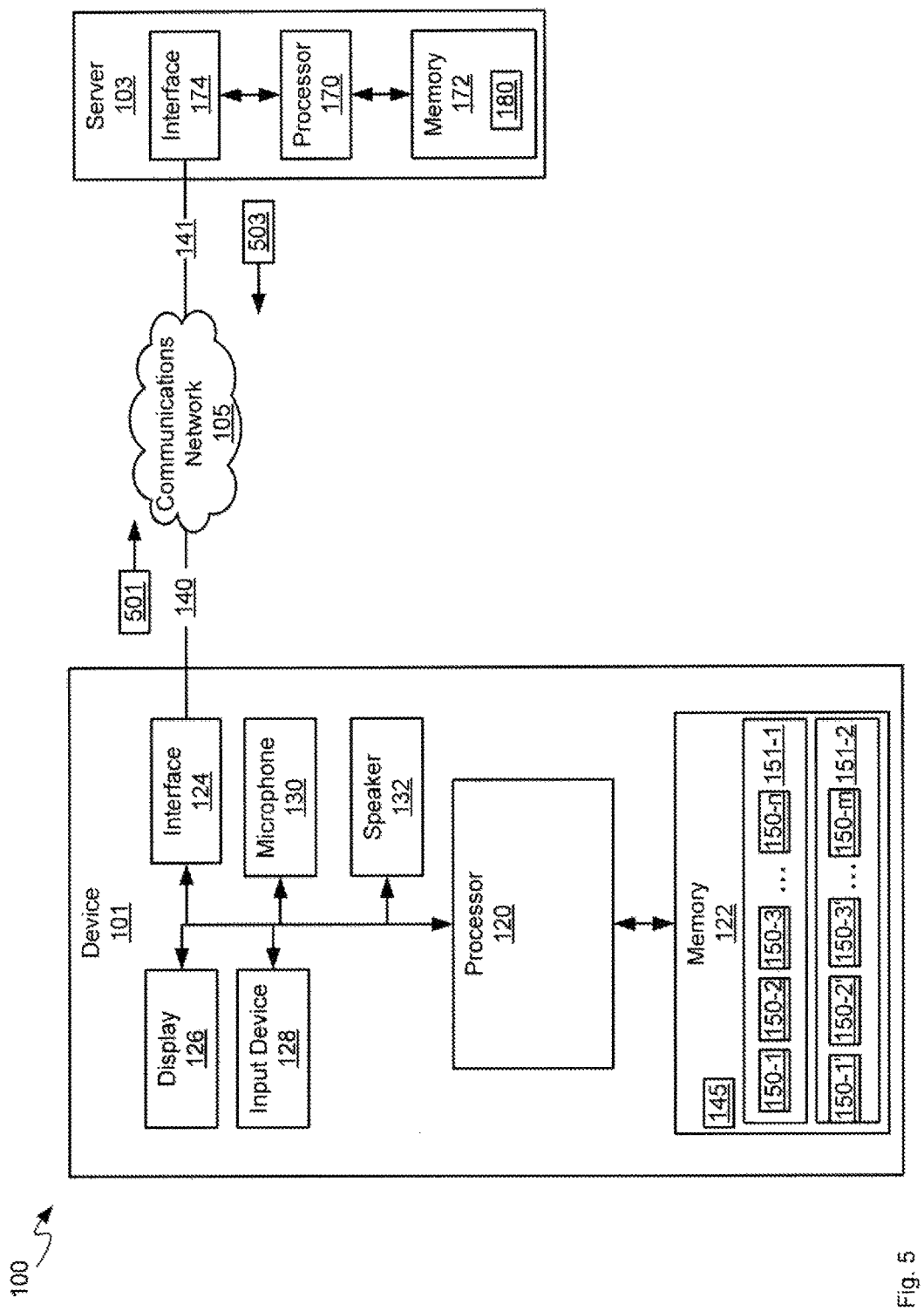
FIG. 5 depicts the system of FIG. 1 with a device and a server exchanging account identifier and account type data, according to non-limiting implementations.

In any event, once the account identifier is received, with reference to FIG. 5, device 101 transmits data 501 comprising the account identifier to server 103 (e.g. block 207), which processes data 501 and returns an indication 503 that the account is of a given type, which is received at device 101 (e.g. block 209).

Indication 503 can comprise any suitable data for indicating a type of account associated with the account identifier. In some implementations, only two types of accounts are provided: accounts associated with server 103 and accounts not associated with server 103. Hence, in these implementations, indication 503 can comprise one of two possible binary responses, including, but not limited to one of a "1" and a "0", one of "Yes" and "No", and the like. In other implementations, indication 503 can comprise a textual indication of an account type, including, but not limited to, one of a "Corporate" account and a "Personal" account. However, in other implementations, more than two types of accounts are provided, and indication 503 is indicative of one of a plurality of account types.

In any event, processor 120 processes indication 503 to determine a given type of account associated with the account identifier received at block 205, and hence further determines which subset 151 of data 150 to use to generate staged prompts at display 126.

Figure 6:
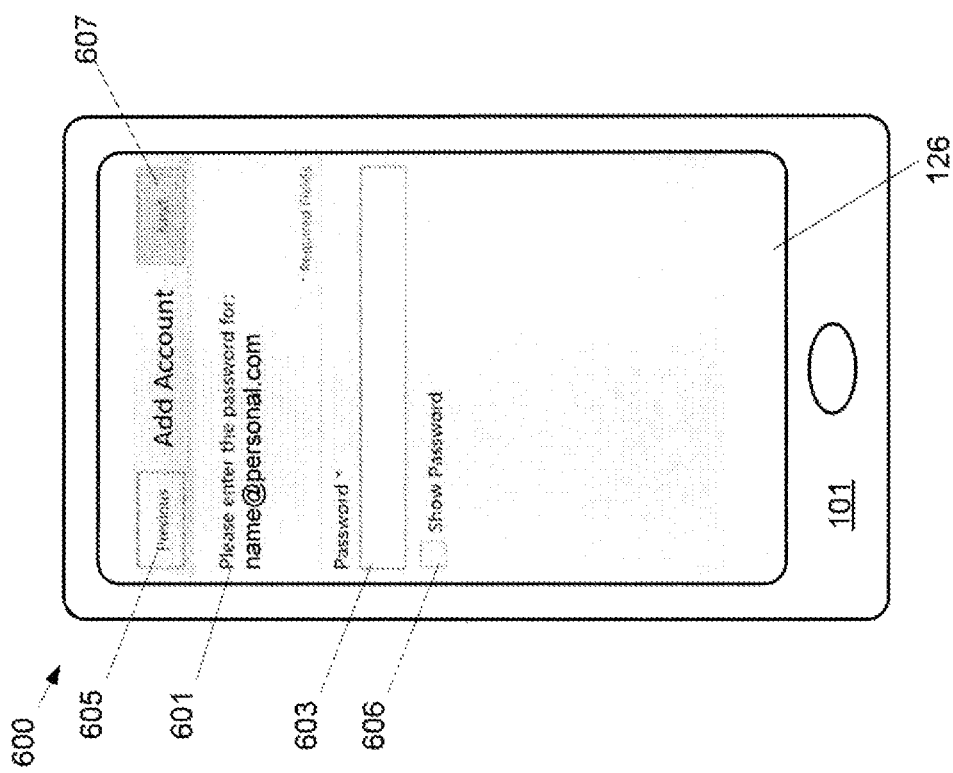
FIG. 6 depicts a staged prompt for receiving information associated with a first account type, according to non-limiting implementations.

For example, attention is next directed to FIG. 6, which depicts a staged prompt 600 in which it is assumed that an account identifier of a "Personal" account type was received at field 403 of view 400. By way of non-limiting example, it is assumed that the account identifier received at field 403 was "name@personal.com". It is hence further assumed that server 103 identified "name@personal.com" as being associated with a "Personal" account type as either data 180 did not comprise "name@personal.com" (and/or a portion thereof) and/or server 103 is not associated with a domain name of "personal.com". It is hence further assumed that indication 503 comprised an indication of account identifier "name@personal.com" being a "Personal" account type.

Furthermore, processor 120, upon receiving indication 503 determines which of subsets 151 of data 150 to process to provide staged prompts. In these implementations, subset 151-1 can be associated with a "Personal" account type, and hence processor 120 processes data 150 in subset 151-1, for example in a given order as indicated via application 145.

For example, staged prompt 600 of FIG. 6 can be generated by processing subset 151-1. Staged prompt 600 comprises a prompt 601 to enter password data associated with the account identifier received at field 403 of view 400 and a field 603 for receiving the password data. It is appreciated that staged prompt 600 comprises one of a series of staged prompts for receiving data associated with the account identifier received at field 403. And further staged prompt 600 is provided with data identifying respective information to be received at staged prompt 600; in other words, prompt 601 comprises data identifying respective information to be received at field 603. In depicted non-limiting implementations, a selectable option 605 for returning to view 400, and a selectable option 606 for showing the password data are also provided (otherwise when password data is received at field 603, displayed text is one or more of hidden and an unassociated character is provided in place of each received character). Further, in depicted non-limiting implementations, a selectable option 607 for causing processor 120 to generate a next staged prompt, is also provided. For example, password data is received at field 603, and when input data indicating that selectable option 607 has been actuated is received, a next staged prompt (e.g. see FIG. 7) is provided. In some implementations, option 607 is not selectable until password data is received at field 603.

When option 607 is selected, processor 120 can transmit password data received at field 603 or store the password data at memory 122 until a last staged prompt associated with the account type is provided.

Figure 7:
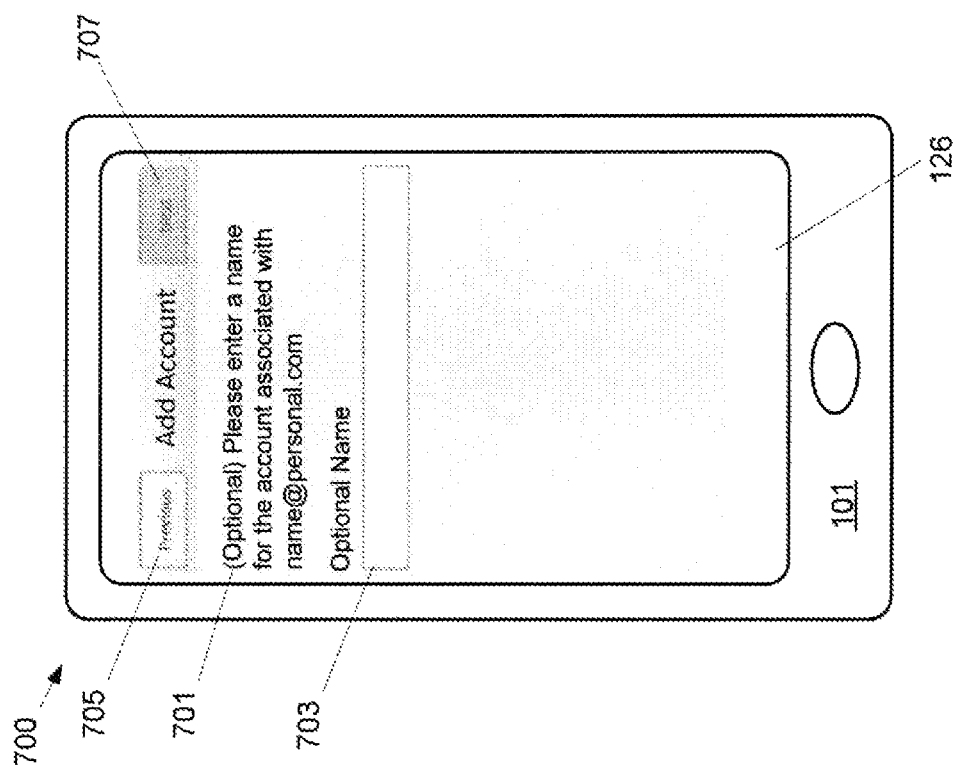
FIG. 7 depicts an optional next staged prompt for receiving information associated with the first account type, according to non-limiting implementations.

In further response to option 607 being selected, and/or in response to receiving password data at field 603, either processor 120 can return to view 300, or an optional staged prompt 700 can be generated, as depicted in FIG. 7. Staged prompt 700 can be generated by processing data 150-2 of subset 151-1.

Staged prompt 700 comprises a prompt 701 to enter a natural name identifier associated with the account identifier received at field 403 of view 400 and a field 703 for receiving natural name identifier data. It is hence appreciated that staged prompt 700 comprises a next one of a series of staged prompts (after a first staged prompt of FIG. 6) for receiving data associated with the account identifier received at field 403. And further staged prompt 700 is provided with data identifying respective information to be received at staged prompt 700; in other words, prompt 701 comprises data identifying respective information to be received at field 703.

In depicted non-limiting implementations, a selectable option 705 for returning to staged prompt 600 is also provided. Further, in depicted non-limiting implementations, a selectable option 707 for causing processor 120 to generate a next staged prompt, is also provided. For example, natural name identifier data is received at field 703, and when input data indicating that selectable option 707 has been actuated is received, a next staged prompt, if any, is provided. In some implementations, option 707 is not selectable until a natural name account identifier is received at field 703.

However, when option 707 is selected and when a staged prompt is a last staged prompt in a series, and last information is received, rather than generate another staged prompt, one of views 300, 400 is provided such that another application type can be selected, and another account identifier can be received, for example at field 403. Alternatively, processor 120 can be enabled to: when a given staged prompt is a last staged prompt, and last information is received, close the same application 145.

It is further appreciated that while FIGS. 1 and 5 depicts further elements of subset 151-1 (i.e. data 150-3 . . . 150-n), in described implementations, these elements are superfluous, however in other implementations each of these further elements can comprise data for generating further staged prompts associated with a given account type.

Hence, at least blocks 205 to 211 can be repeated, such that processor 120 is further enabled to: receive, in application 145, another account identifier indicative of another account; transmit, to server 103, the another account identifier; receive, from server 103, another indication that the different account is of a respective type; and, provide, in same application 145, more staged prompts at display 126 for respective information associated with the different account, the more staged prompts depending on the another indication.

In other words, another account identifier can be received: for example, block 203 can be repeated and view 400 can be provided after staged prompt 700 and another account identifier received at field 403. Alternatively, processor 120 can process a next account setup message in a list of messages and extract another account identifier identifying a different account.

Either way, blocks 205 to 207 repeated and at block 209 another indication of a respective type of a different account is received at device 101 from server 103, and at block 211, more staged prompts are provided at display 126 for respective information associated with the different account, the more staged prompts depending on the another indication.

Figure 8:
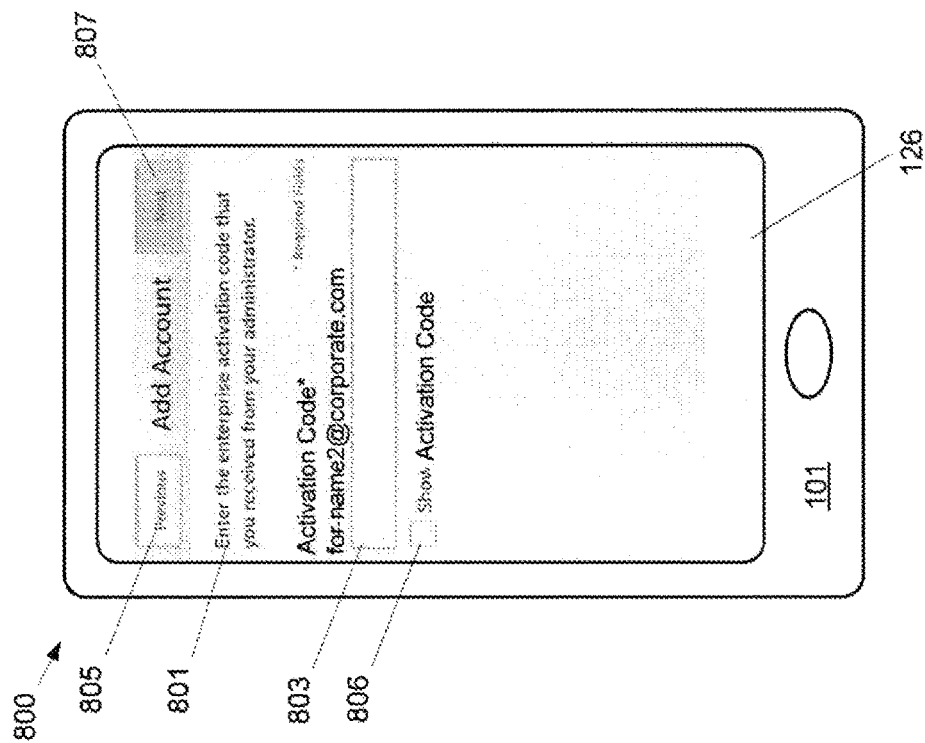
FIG. 8 depicts a staged prompt for receiving information associated with a second account type, according to non-limiting implementations.
Figure 9:
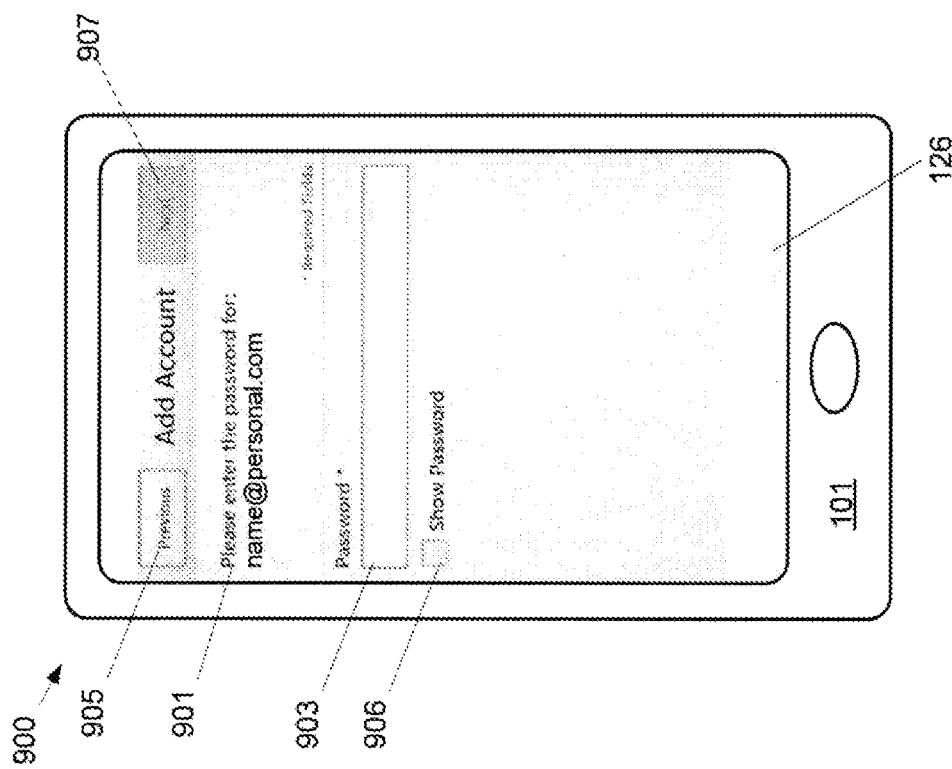
FIG. 9 depicts a next staged prompt for receiving further information associated with the second account type, according to non-limiting implementations.

For example, attention is directed to FIG. 8 which depicts a staged prompt 800 in which it is assumed that an account identifier of a "Corporate" account type was received at field 403 of view 400, or at least an account type different from an account type associated with the afore described "names@personal.com" account identifier. By way of non-limiting example, it is assumed that the account identifier received at field 403 was "name2@corporate.com". It is hence further assumed that server 103 identified "name2@corporate.com" as being associated with a "Corporate" account type as either data 180 comprised "name@personal.com" (and/or a portion thereof) and/or server 103 is associated with a domain name of "corporate.com". It is hence further assumed that another indication (similar to indication 503) comprised an indication of account identifier "name2@corporate.com" being a "Corporate" account type. Furthermore, processor 120, upon receiving the another indication determines which of subsets 151 of data 150 to process to provide staged prompts. In these implementations, subset 151-2 can be associated with a "Corporate" account type, and hence processor 120 processes data 150 in subset 151-2 in a given order, for example according to application 145.

For example, staged prompt 800 of FIG. 8 can be generated by processing data 150-1' of subset 151-2. In contrast to staged prompt 600, staged prompt 800 comprises a prompt 801 to enter activation code data associated with the account identifier received at field 403 of view 400 (i.e. in these implementations, "name2@corporate.com") and a field 803 for receiving the activation code data. It is appreciated that activation code data comprises a code for activating an associated account at server 103. This is in contrast to receiving password data at field 603 of staged prompt 600.

It is appreciated that staged prompt 800 comprises one of a series of staged prompts for receiving data associated with the account identifier received at field 403. And further the staged prompt is provided with data identifying respective information to be received at the staged prompt; in other words, prompt 801 comprises data identifying respective information to be received at field 803. In depicted non-limiting implementations, a selectable option 805 for returning to view 400 is provided, and a selectable option 806 for showing the activation code data is also provided (otherwise when activation code data is received at field 803, displayed text is one or more of hidden and an unassociated character is provided in place of each received character). Further, in depicted non-limiting implementations, a selectable option 807 for causing processor 120 to generate a next staged prompt, is also provided. For example, activation code data is received at field 803, and when input data indicating that selectable option 807 has been actuated is received, a next staged prompt (e.g. see FIG. 9) is provided. In some implementations, option 807 is not selectable until activation code data is received at field 803.

When option 807 is selected, processor 120 can transmit password data received at field 803 or store the password data at memory 122 until a last staged prompt associated with the account type is provided.

However, when a next staged prompt is available via subset 151-2, a next staged prompt is provided. For example, a next staged prompt 900 of FIG. 9 can be generated by processing data 150-2' of subset 151-2. Staged prompt 900 comprises a prompt 901 to enter password data associated with the account identifier received at field 403 of view 400 and a field 903 for receiving the password data. In other words, it is appreciated that staged prompt 900 comprises one of a series of staged prompts for receiving data associated with the account identifier received at field 403. And further the staged prompt is provided with data identifying respective information to be received at the staged prompt; in other words, prompt 901 comprises data identifying information to be received at field 903.

In depicted non-limiting implementations, a selectable option 905 for returning to staged prompt 800 is provided. Further, a selectable option 906 for showing the password data is provided, similar to selectable options 606, 806. Further, in depicted non-limiting implementations, a selectable option 907 for causing processor 120 to generate a next staged prompt is also provided. For example, password data is received at field 903, and when input data indicating that selectable option 907 has been actuated is received, a next staged prompt can be provided. In some implementations, option 907 is not selectable until password data is received at field 903.

When option 907 is selected, processor 120 can transmit password data received at field 903 or store the password data at memory 122 until a last staged prompt associated with the account type is provided. When a last stage prompt is provided, another account identifier can be received, as described above, or alternatively, application 145 can be closed.

However, in example implementations, a next staged prompt is available via subset 151-2, a next staged prompt is provided.

Figure 10:
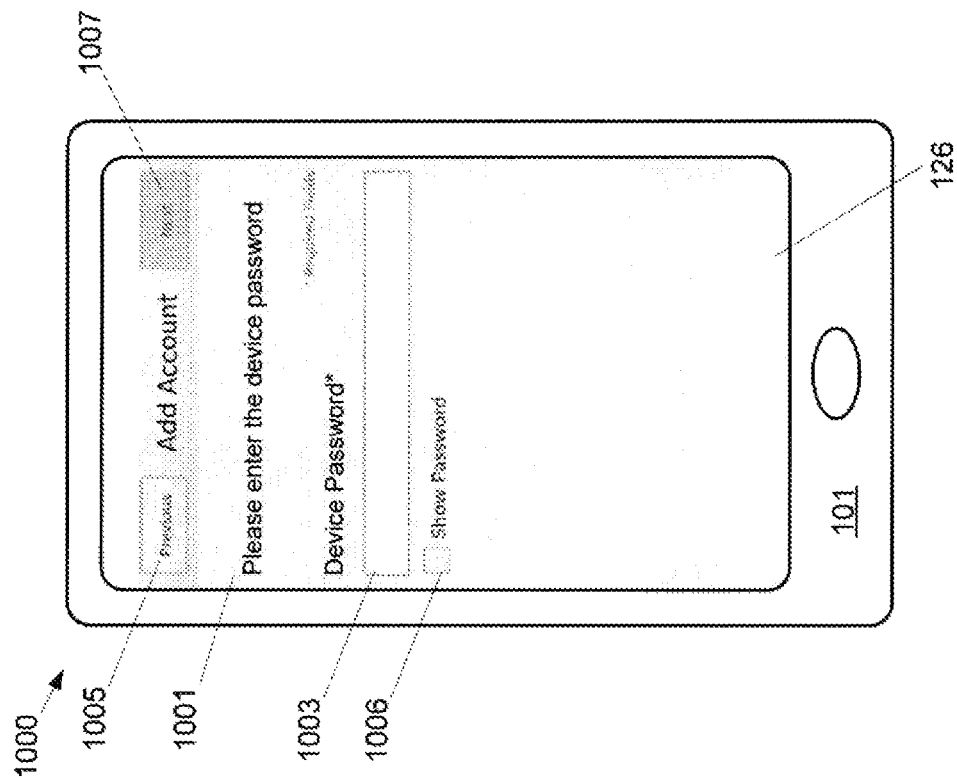
FIG. 10 depicts a next staged prompt for receiving yet further information associated with the second account type, according to non-limiting implementations.

For example, a next staged prompt 1000 of FIG. 10 can be generated by processing data 150-3' of subset 151-2. Staged prompt 1000 comprises a prompt 1001 to enter device password associated with device 101, and a field 1003 for receiving the password data. In other words, it is appreciated that staged prompt 1000 comprises one of a series of staged prompts for receiving data associated with the account identifier received at field 403. And further staged prompt 1000 is provided with data identifying respective information to be received at staged prompt 1000; in other words, prompt 1001 comprises data identifying respective information to be received at field 1003.

In depicted non-limiting implementations, a selectable option 1005 for returning to view 800 is provided. Further, a selectable option 1006 for showing the device password data is also provided, similar to selectable options 606, 806. Further, in depicted non-limiting implementations, a selectable option 1007 for causing processor 120 to generate a next staged prompt, if any, is also provided. For example, device password data is received at field 1003, and when input data indicating that selectable option 1007 has been actuated is received, a next staged prompt, if any, can be provided. In some implementations, option 1007 is not selectable until device password data is received at field 1003.

When option 1007 is selected, processor 120 can transmit password data received at field 1003 or store the password data and/or device password data at memory 122 until a last staged prompt associated with the account type is provided. When a last stage prompt is provided, another account identifier can be received, as described above, or alternatively, application 145 can be closed.

Either way, information associated with the respective account, received via the staged prompts, is transmitted to server 103 for one or more of activation of an account and associating an account with device 101. For example, activation code data received at field 803 can be compared to activation code data stored in data 180 at server 103 and, when they match, the associated account is activated. Thereafter, data associated with a respective associated account can be one or more of received at device 101, transmitted to device 101 and pushed to device 101.

It is further appreciated that while FIGS. 1 and 5 depicts further elements of subset 151-2 (i.e. data 150-*m*, and the like), in described implementations, these elements are superfluous, however in other implementations each of these further elements can comprise data for generating further staged prompts associated with a given account type.

It is further appreciated that, while for each of the provided examples only two or three staged prompts are provided, in other implementations, more than two or three staged prompts can be provided, each staged prompt for prompting respective information associated with account that is being one or more of activated and associated with a given device. Further, in some implementations, only one staged prompt can be provided.

It is yet further appreciated, upon comparing views 600, 700 with views 800, 900, 1000 that staged prompts can differ depending on a type of account, identified by server 103. Further types of information requested and an order of information requested in the staged prompts, can depend on a type of account. For example, in the described examples, when the type of account comprises a "Personal" account, password data is requested in a first stage and natural name data to be associated with an account is requested in a second stage; in contrast, when the type of account comprises a "Corporate" account, activation code data is requested in a first stage and a password data/device password data is requested in a second stage. However, while specific non-limiting examples of types and order of information have been described, other types and orders of information are within the scope of present implementations.

Indeed, by providing staged prompts, in a single application, to receive information associated with different account types, the staged prompts dependent on a type of account, confusion regarding which information to be received can be avoided, obviating one or more of unnecessary processing of irrelevant information and transmitting the irrelevant information to a server, thereby saving bandwidth. In other words, rather than request all information associated with a given account type in a single prompt, in present implementations, the information is requested in stages, and/or in a series of prompts; further information associated with different account types are requested in single application.

Those skilled in the art will appreciate that in some implementations, the functionality of device 101 and server 103 can be implemented using pre-programmed hardware or firmware elements (e.g., application specific integrated circuits (ASICs), electrically erasable programmable read-only memories (EEPROMs), etc.), or other related components. In other implementations, the functionality of device 101 and server 103 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A device comprising:
a processor; a memory storing: an application dedicated to setting up one or more of personal information manager (PIM) accounts, email accounts, calendar accounts, and contact accounts, such that data associated with one or more accounts can be one or more of received at the device, transmitted to the device, and pushed to the device; a first data set comprising data for generating, in a first given order, a first set of staged prompts associated with a first account type, and a second data set comprising respective data for generating, in a second given order, a second set of staged prompts associated with a second account type, different from the first account type, the second data set different from the first data set; an input device; and a display device, the processor configured to:
render, at the display device, the application, including an account identifier field for receiving an account identifier;
receive, using the input device, the account identifier in the account identifier field, the account identifier including a domain name;
transmit, to a server, the account identifier indicative of an account;
in response to transmitting to the server the account identifier, receive, from the server, an indication that the account is of the first account type or the second account type different from the first account type, the first account type associated with the server when the server is associated with the domain name and the second account type not associated with the server when the server is not associated with the domain name; and, when the account is of the first account type, the indication further indicates that the account is associated with the server; and when the account is of the second account type, the indication further indicates that the account is not associated with the server;
when the indication indicates that the account is of the first account type: retrieve, from the memory, the first data set; provide, at the display device, and in the application, the first set of staged prompts for information associated with the first account type, each of the first set of staged prompts provided, in the first given order, at successive screens of the display device and within the application; receive, in each of the first set of staged prompts, the information associated with the first account type; and transmit, to the server, the information associated with the first account type; and,
when the indication indicates that the account is of the second account type: retrieve, from the memory, the second data set; provide, at the display device, and in the application, the second set of staged prompts for information associated with the second account type, each of the second set of staged prompts provided, in the second given order, at successive screens of the display device and within the application; receive, in each of the second set of staged prompts, the information associated with the second account type; and transmit, to the server, the information associated with the second account type,
wherein information associated with a respective account type that is transmitted to the server, received using the first set of staged prompts or the second set of staged prompts is for one or more of activation of the account and associating the account with the device.

2. The device of claim 1, wherein the processor is further configured to receive the account identifier in one or more of the account identifier field and a list of messages.

3. The device of claim 1, wherein the account identifier identifies the account as being one of a corporate account associated with the server and a personal account not associated with the server.

4. The device of claim 1, wherein the information associated with the respective account type received using the first set of staged prompts or the second set of staged prompts comprises one or more of an activation code, an account password and a device password.

5. The device of claim 1, wherein each of the first set of staged prompts and the second set of staged prompts is provided with data identifying respective information to be received at a respective staged prompt.

6. The device of claim 1, wherein the processor is further configured to:
receive respective information in response to providing a respective staged prompt; and, when the respective information is received,
provide a next staged prompt to receive next information.

7. The device of claim 1, wherein the processor is further configured to, when a given staged prompt is a last staged prompt, and last information is received:
receive, in another account identifier field of the application, another account identifier indicative of another account;
transmit, to the server, the another account identifier;
receive, from the server, another indication that the different account is of a respective type; and,
provide, in the application, more staged prompts at the display device for respective information associated with the different account, the more staged prompts depending on the another indication.

8. The device of claim 1, wherein the processor is further configured to, when a given staged prompt is a last staged prompt, and last information is received, close the application.

9. A method comprising:
at a device comprising: a processor; a memory storing: an application dedicated to setting up one or more of personal information manager (PIM) accounts, email accounts, calendar accounts, and contact accounts, such that data associated with one or more accounts can be one or more of received at the device, transmitted to the device, and pushed to the device; a first data set comprising data for generating, in a first given order, a first set of staged prompts associated with a first account type, and a second data set comprising respective data for generating, in a second given order, a second set of staged prompts associated with a second account type, different from the first account type, the second data set different from the first data set; an input device; and a display device,
rendering, at the display device, the application, including an account identifier field for receiving an account identifier;
receiving, using the input device, the account identifier in the account identifier field, the account identifier including a domain name;
transmitting, to a server, the account identifier indicative of an account;
in response to the transmitting to the server the account identifier, receiving, at the device from the server, an indication that the account is of the first account type or the second account type different from the first account type, the first account type associated with the server when the server is associated with the domain name and the second account type not associated with the server when the server is not associated with the domain name; and, when the account is of the first account type, the indication further indicates that the account is associated with the server; and when the account is of the second account type, the indication further indicates that the account is not associated with the server;

when the indication indicates that the account is of the first account type: retrieving, from the memory, the first data set; providing, at the display, and in the application, the first set of staged prompts for information associated with the first account type, each of the first set of staged prompts provided, in the first given order, at successive screens of the display device and within the application; receive, in each of the first set of staged prompts, the information associated with the first account type; and transmit, to the server, the information associated with the first account type; and, when the indication indicates that the account is of the second account type: retrieve, from the memory, the second data set; provide, at the display device, and in the application, the second set of staged prompts for information associated with the second account type, each of the second set of staged prompts provided, in the second given order, at successive screens of the display device and within the application; receive, in each of the second set of staged prompts, the information associated with the second account type; and transmit, to the server, the information associated with the second account type, wherein information associated with a respective account type that is transmitted to the server, received using the first set of staged prompts or the second set of staged prompts is for one or more of activation of the account and associating the account with the device.

10. The method of claim 9, further comprising receiving the account identifier in one or more of the account identifier field and a list of messages.

11. The method of claim 9, wherein the account identifier identifies the account as being one of a corporate account associated with the server and a personal account not associated with the server.

12. The method of claim 9, wherein the information associated with the respective account type received using the first set of staged prompts or the second set of staged prompts comprises one or more of an activation code, an account password and a device password.

13. The method of claim 9, wherein each of the first set of staged prompts and the second set of staged prompts is provided with data identifying respective information to be received at a respective staged prompt.

14. The method of claim 9, further comprising:
receiving respective information in response to providing a respective staged prompt; and, when the respective information is received,
providing a next staged prompt to receive next information.

15. The method of claim 9, further comprising, when a given staged prompt is a last staged prompt, and last information is received:

receiving, in another account identifier field of the application, another account identifier indicative of another account;
transmitting, to the server, the another account identifier;
receiving, from the server, another indication that the different account is of a respective type; and,
providing, in the application, more staged prompts at the display device for respective information associated with the different account, the more staged prompts depending on the another indication.

16. The method of claim 9, further comprising, when a given staged prompt is a last staged prompt, and last information is received, close the application.

17. A non-transitory computer-readable medium storing a computer program, wherein execution of the computer program is for:

at a device comprising: a processor; a memory storing: an application dedicated to setting up one or more of personal information manager (PIM) accounts, email accounts, calendar accounts, and contact accounts, such that data associated with one or more accounts can be one or more of received at the device, transmitted to the device, and pushed to the device; a first data set comprising data for generating, in a first given order, a first set of staged prompts associated with a first account type, and a second data set comprising respective data for generating, in a second given order, a second set of staged prompts associated with a second account type, different from the first account type, the second data set different from the first data set; an input device; and a display device, rendering, at the display device, the application, including an account identifier field for receiving an account identifier;

receiving, using the input device, the account identifier in the account identifier field, the account identifier including a domain name;

transmitting, to a server, the account identifier indicative of an account;

in response to the transmitting to the server the account identifier, receiving, at the device from the server, an indication that the account is of the first account type or the second account type different from the first account type, the first account type associated with the server when the server is associated with the domain name and the second account type not associated with the server when the server is not associated with the domain name; and, when the account is of the first account type, the indication further indicates that the account is associated with the server; and when the account is of the second account type, the indication further indicates that the account is not associated with the server;

when the indication indicates that the account is of the first account type: retrieving, from the memory, the first data set; providing, at the display, and in the application, the first set of staged prompts for information associated with the first account type, each of the first set of staged prompts provided, in the first given order, at successive screens of the display device and within the application; receive, in each of the first set of staged prompts, the information associated with the first account type; and transmit, to the server, the information associated with the first account type; and, when the indication indicates that the account is of the second account type: retrieve, from the memory, the second data set; provide, at the display device, and in the application, the second set of staged prompts for information associated with the second account type, each of the second set of staged prompts provided, in the second given order, at successive screens of the display device and within the application; receive, in each of the second set of staged prompts, the information associated with the second account type; and transmit, to the server, the information associated with the second account type, wherein information associated with a respective account type that is transmitted to the server, received using the first set of staged prompts or the second set of staged prompts is for one or more of activation of the account and associating the account with the device.

\* \* \* \* \*